United States Patent [19]

Ando

[11] Patent Number: 4,650,982

[45] Date of Patent: Mar. 17, 1987

[54] OPTICAL HEAD FOR A DISC READER
[75] Inventor: Hideo Ando, Hino, Japan
[73] Assignee: Tokyo Shibaura Denki Kabushiki Kaisha, Kawasaki, Japan
[21] Appl. No.: 588,228
[22] Filed: Mar. 12, 1984
[30] Foreign Application Priority Data Mar. 15, 1983 [JP] Japan .................... 58-42611

[51] Int. Cl.⁴ ............................. G01J 1/20
[52] U.S. Cl. ...................... 250/201; 369/45
[58] Field of Search ........... 250/201, 204, 208, 209; 369/44, 45, 46

[56] References Cited

U.S. PATENT DOCUMENTS 4,503,324 3/1985 Yokota ................. 369/45
4,521,680 6/1985 Ando ................... 250/201

FOREIGN PATENT DOCUMENTS 0070552 1/1983 European Pat. Off. .

Primary Examiner—David C. Nelms
Attorney, Agent, or Firm—Cushman, Darby & Cushman

[57] ABSTRACT

In an optical head, laser beams are converged by an objective lens and projected on a light-receiving surface of an optical disk. The laser beam is reflected by the light-receiving surface, converged by the objective lens into parallel laser beams, and directed to a light shielding plate. Only the laser beam passing through the region spaced from the optical axis is allowed to pass by the light shielding plate, and part of this laser beam is converged by a convergent lens and projected on photo sensitive regions of the photo detecting unit. The objective lens has a convergent point and an inherent maximum defocusing allowance with reference to this convergent point. The photo sensitive regions have a total area larger than that of a circle having a radius Rd.

$$Rd = (r/F)\{|\Delta|/m + (m + |\Delta|/f)2|\delta c|\}$$

wherein F is a distance between a principal point of the objective lens which is at the side of the light-reflecting surface and the convergent point of the objective lens, r is a radius of an exit pupil of the objective lens, m is a multiplication of the beam spot formed on the photo sensitive regions, and f is a focal length of the optical system.

13 Claims, 32 Drawing Figures

F I G. 1
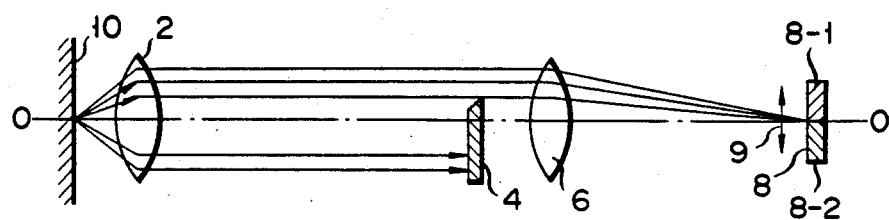
F I G. 2
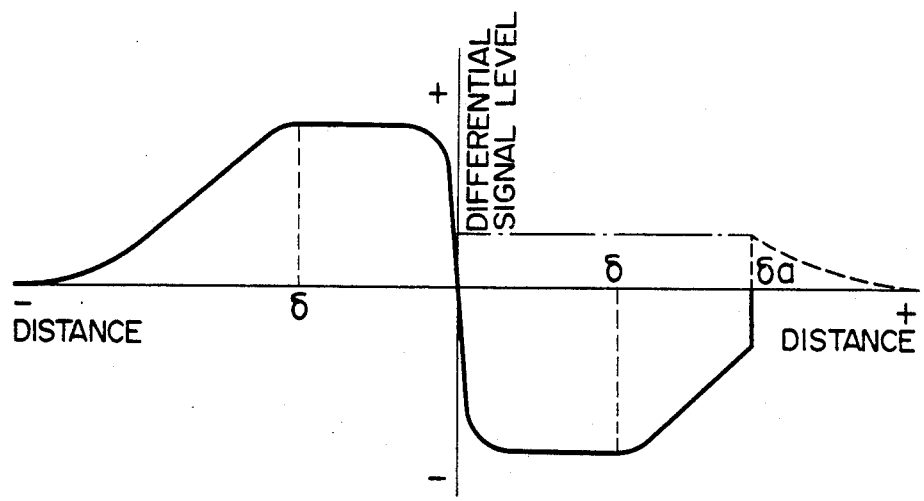

OPTICAL HEAD FOR A DISC READER

BACKGROUND OF THE INVENTION

This application is generally related to co-pending U.S. application Ser. Nos. 625,792 and 598,434, and to U.S. Pat. Nos. 4,521,680 and 4,585,933.

The present invention relates to an optical head for focusing a light beam for reading information on an information recording medium such as an optical disk, and more particularly, to an improvement in photo detector for an optical head for detecting a whether the light beam is focused.

Various optical information recording/reproduction systems have been recently devised which optically write and read information on and from an information recording medium (to be referred to as an optical disk hereinafter). For example, information recording/reproduction systems are known in which information is only read from a recording medium such as a CD (compact disk) type of DAD or a video disk, an image file, a still image file, a COM (computer output memory) or the like. In such systems, information is initially recorded on a medium by establishing a state change such as forming a hole (pit) in a recording layer by a focused light beam. In other information recording/reproduction systems, information is optically written on or read from an information recording medium for recording/reproduction or from an erasable information recording medium (to be referred to as an optical disk hereinafter). In these systems, in both the write and read modes, a light beam must always be focused on the optical disk. In other words, the beam waist of the light beam must be coincident with the optical disk surface, and a minimum-sized beam spot must be formed on the optical disk. In view of this requirement, the optical head frequently has a focus detecting system for detecting the state of focus of the light beam. Various such focus detecting systems have been proposed. For example, U.S. Ser. No. 399,873, filed on July 19, 1982, now U.S. Pat. No. 4,521,680, and corresponding EPC application No. 82106508.3, filed on July 19, 1982 disclose a focus detecting system adopting the so-called knife edge method.

In this focus detecting system adopting the knife edge method, as shown in FIG. 1, a laser beam is reflected from a recording layer or light reflecting layer 10 on which information has to be or is already been recorded. An objective lens 2, a knife edge 4, a convergent lens 6 and a photo detecting unit 8 are arranged on an optical path O—O of the reflected light from the recording layer 10. The knife edge 4 serves to allow passage of only that laser beam component which is spaced apart from the optical axis 0—0. The photo detecting unit 8 detects a laser beam which is converged by the convergent lens 6. The photo detecting unit 8 has two, first and second, photo sensing regions or photo sensitive regions 8-1 and 8-2, and is located at the back focal point of the convergent lens 6. In such a focus detecting system, the defocusing state is not detected by a change in the beam spot size on the photo detecting unit 8 but is detected by a deviation in the beam spot position in a direction 9. In the just in-focusing state, the beam spot is formed at the boundary between the two photo sensitive regions 8-1 and 8-2 of the photo detecting unit 8. A differential signal of the two photo signals from these regions 8-1 and 8-2 is kept substantially zero. In contrast to this, when the objective lens 2 draws too near to the recording layer 10 or is spaced too far apart therefrom, resulting in the defocusing state, the differential signal of the signals from the first and second photo sensitive regions 8-1 and 8-2 changes in the positive or negative direction. The level of this differential signal depends on the distance between the objective lens 2 and the recording layer 10, as shown in FIG. 2. In FIG. 2, the distance $a$ between the objective lens 2 and the recording layer 10 in the just in-focusing state is set to be 0, and the distance has a positive value when the two members are spaced too far apart from each other and has a negative value when the two parts draw too close to each other.

The focus detecting system as described above has various problems as will be described below:

(1) In order to allow information recording at a high density, and fast and correct information reproduction, tracking guides are formed in an optical disk in the form of grooves or projections. When information is recorded in the form of pit arrays, pit arrays are recorded on the optical disk. When such tracking guides or pit arrays are irradiated with a laser beam, the irradiated light is diffracted by the tracking guides or pit arrays. Thus, a diffraction pattern of an irregular shape is formed on photo sensitive regions of a photo detecting unit which receives light reflected by the optical disk. This diffraction pattern is formed as a dark portion in the beam spot pattern which is formed on the photo sensitive regions of the photo detecting unit. For this reason, in the optical head which detects the state of focus in accordance with a difference between signals obtained from photo sensitive regions, the defocusing state can be erroneously detected to be the just in-focusing state or vice versa due to the diffraction pattern. A similar problem may also occur when there is a defect in the optical system of the optical head or when the laser beam is diffracted by dust or the like.

(2) In an optical disk, in general, the recording layer 10 is formed on a transparent substrate, and a laser beam converged by the objective lens 2 is projected onto the recording layer 10 through the substrate. When the optical disk deforms or becomes bent and the substrate is accordingly deformed, an aberration such as a coma is produced. When the aberration such as a coma is produced, the image pattern including the coma is formed on the photo sensitive regions 8-1 and 8-2 in the just in-focusing state. Even if the objective lens system has only a small coma aberration, if the defective pattern due to such a coma aberration is formed on the photo sensitive regions 8-1 and 8-2, the defocusing state can be erroneously detected to be the just in-focusing state or vice versa.

(3) Near the focal point of the convergent lens 6, the beam spot has a specific size due to the influence of light diffraction (wave characteristics of light). For this reason, when the photo detecting unit is arranged at the focal point of the convergent lens 6 in the just in-focusing state, the defocusing detection sensitivity near the focal point is lower than the theoretical value.

(4) The beam spot size at the focal point of the convergent lens 6 is very small. In the case of an optical system in which the photo detecting unit is arranged at the focal point of the convergent lens, a slight change in the position of the photo detecting unit due to a change in temperature results in an erroneous detection of the just in-focusing state as the defocusing state.

(5) When there is a large aberration, the positions of the Gauss image plane and the least circle of confusion deviate from each other. Therefore, the focus detection characteristics near the just in-focusing position are degraded, and the detection sensitivity is degraded.

SUMMARY OF THE INVENTION

It is an object of the present invention to provide an optical head which is capable of detecting a state of focus with high reliability and sensitivity.

According to an aspect of the present invention, there is provided an optical head for focusing a light beam on a light-reflecting surface comprising means for generating a light beam; means for transferring the light beam; an objective lens which converts the transferred light beam into a convergent light beam with a beam waist, projects the light beam on the light-reflecting surface and converges the divergent light beams reflected from the light-reflecting surface, said objective lens having a congergent point and an inherent maximum defocusing allowance $\pm\delta c$ with reference to the convergent point; means for deflecting the light beam directed from the objective lens to the lens system, depending on the distance between the objective lens and the light-reflecting surface; means for converging the light beam transferred from the deflecting means into a convergent point; and a photodetector having photo sensitive regions on which the converged light beam is projected, said photo sensitive regions having a total area which is greater than an area of the beam spot formed on the photodetector when the light beam is projected at the maximum defocusing allowance $\delta c$ and is reflected by the light-reflecting surface.

BRIEF DESCRIPTION OF THE DRAWINGS

FIG. 1 shows an optical system of a conventional optical head adopting the knife edge method;

FIG. 2 is a graph showing the relationship between a differential signal obtained from the photo detecting unit shown in FIG. 2 and the distance between the objective lens and the optical disk;

DETAILED DESCRIPTION OF THE PREFERRED EMBODIMENTS

Figure 3:
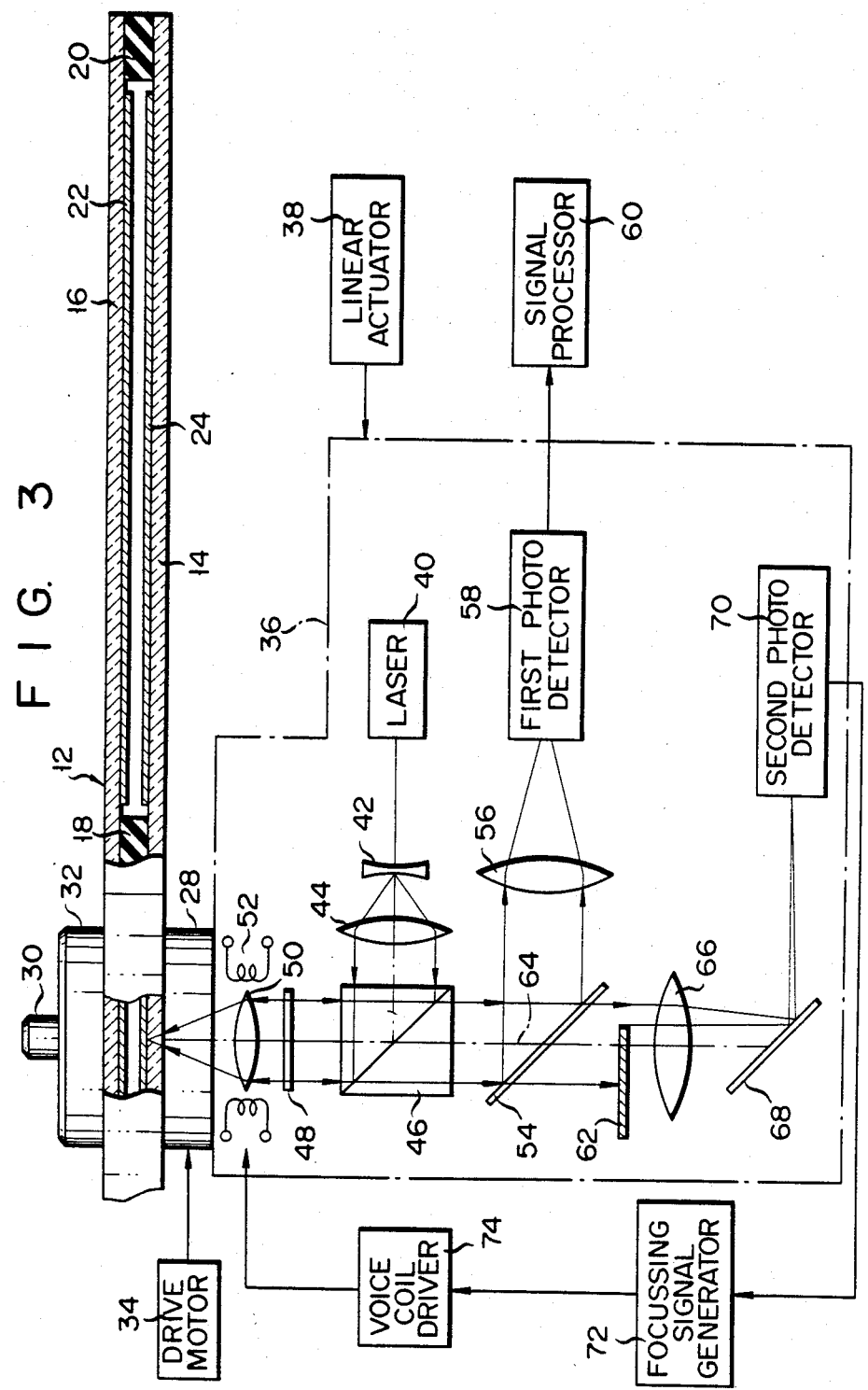
FIG. 3 is block diagram of an optical system in which the optical head of the present invention is assembled.

An optical system for recording and reproducing information using an optical head of the present invention will now be described with reference to FIG. 3. An optical disk 12 is obtained by adhering together a pair of disk-shaped transparent plates 14 and 16 through inner and outer spacers 18 and 20. Information recording layers or light reflecting layers 22 and 24 are formed by deposition on the inner surfaces of the respective transparent plates 14 and 16. Tracking guides 26 are formed helically or concentrically on each of the light reflecting layers 22 and 24. Information is recorded on these tracking guides 26 in the form of pits. A hole is formed at the center of the optical disk 12. When the optical disk 12 is placed on a turntable 28, a center spindle 30 of the turntable 28 extends through this central hole of the optical disk 12, so that the centers of rotation of the turntable 28 and the optical disk 12 are aligned. A chuck device 32 is mounted on the center spindle 30 of the turntable 28 and fixes the optical disk 12 on the turntable 28. The turntable 28 is rotatably supported on a support base (not shown), and is driven at a constant speed by a drive motor 34.

An optical head 36 is arranged to be movable in the radial direction of the optical disk 2 by means of a linear actuator 38 or a rotary arm. A laser 40 for generating a laser beam is arranged inside the optical head 36. When information is to be written on the optical disk 12, the laser 40 generates a laser beam which has an intensity modulated in accordance with such information. When the recorded information is to be read from the optical disk 12, a laser beam having a constant intensity is generated from the laser 40. The laser beam from the laser 40 is diverged by a concave lens 42, collimated by a convex or collimator lens 44 into parallel light rays, and directed toward a polarization beam splitter 46. The parallel laser beams reflected by the polarization beam splitter 46 become incident on an objective lens 50 through a ¼ wave plate 48 and are converged toward the light reflecting layer 24 of the optical disk 12 by the objective lens 50. The objective lens 50 is supported by a voice coil 52 to be movable along the optical axis. When the objective lens 50 is located at a predetermined position, the beam waist of the converging laser beam from the objective lens 50 is projected onto the surface of the light reflecting layer 24 to form a minimum-sized spot on the surface of the light reflecting layer 24. In this state, the objective lens 50 is kept in the just in-focusing state to allow the reading and writing of information. When information is written, pits are formed on the tracking guides or preformed grooves 26 on the light reflecting layer 24 by an intensity-modulated laser beam. When information is read out, a laser beam having a constant intensity is intensity-modulated by the pits formed in the tracking guides 26 and is reflected thereby.

The divergent laser beam reflected from the light reflecting layer 24 of the optical disk 12 is converted into parallel light rays by the objective lens 50 and returned to the polarization beam splitter 46 through the ¼ wave plate 48. When the laser beam is returned back through the ¼ wave plate 48, the polarization plane is rotated through 90° as compared to that when the laser beam is reflected by the polarization beam splitter 46. This returned laser beam whose polarization plane is rotated through 90° is not reflected by the polarization beam splitter 46 and passes therethrough. The laser beam emerging from the polarization beam splitter is split by a half mirror 54. One part of the split beam is irradiated onto a first photo detecting unit 58 through a convex lens 56. A first signal from the first photo detecting unit 58, containing information recorded on the optical disk 12, is supplied to a signal processor 60, and is converted into digital data. The other part of the split beam from the half mirror 54 is subjected to extraction by a light shielding plate 62 to extract only a component passing through a region spaced apart from an optical axis 64. The extracted component is passed through a projection lens 66 and becomes incident on a second photo detecting unit 70. The light shielding plate 62 may be replaced by a prism, an aperture, a slit, or a knife edge. As used in this specification and in the claims, the term "deflecting means" will be used to describe those devices which shield, block, or bend the light rays. Thus, "deflecting means" include a light shielding plate; an aperture, a slit, a knife edge, or a prism. A signal from the second photo detecting unit 70 is processed by a focusing signal generator 72. A focusing signal from the focusing signal generator 72 is supplied to a voice coil drive circuit 74. In response to the focusing signal, the voice coil drive circuit 74 drives the voice coil 52 and keeps the objective lens 50 in the just in-focusing state. When the tracking guides 26 formed on the light reflecting layer 24 of the optical disk 12 are to be correctly traced, a signal from the first photo detecting unit 58 can be processed to actuate the linear actuator 38. Alternatively, the objective lens 50 can be moved in the transverse direction or a galvano mirror (not shown) can be used.

Figure 4:
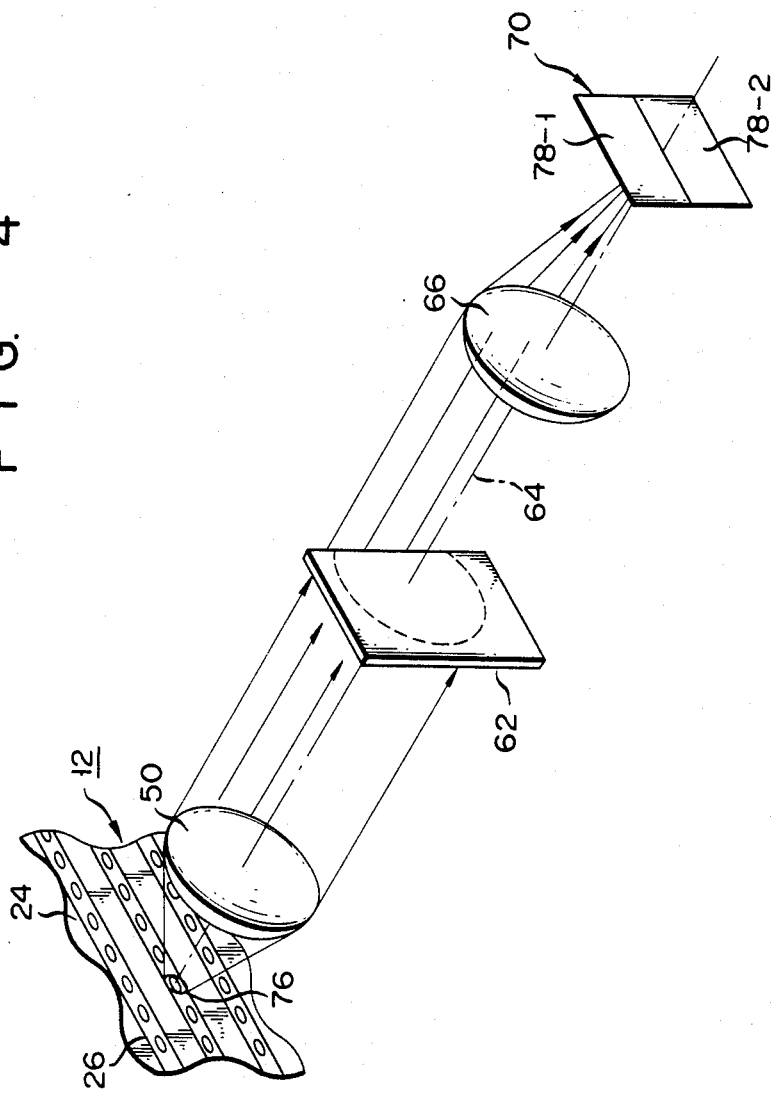
FIG. 4 is a simplified view of the optical system of the optical head shown in FIG. 3.
Figure 5A:
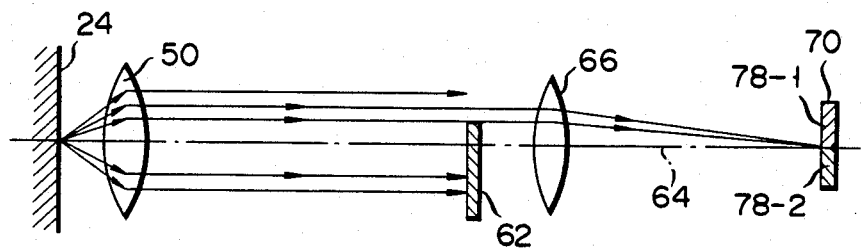
FIGS. 5A, 5B, 5C and 5D show a path of a laser beam in the optical system shown in FIG. 4 in the just in-focusing state and in various defocusing states.
Figure 5B:
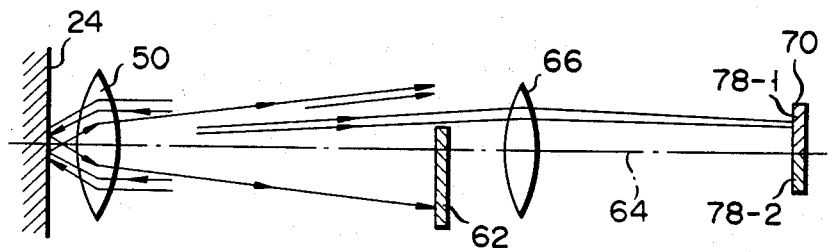

The optical system for detecting the just in-focusing state shown in FIG. 3 is shown simplified in FIG. 4. The path of the laser beam associated with the just in-focusing state and with various defocusing states is shown in FIGS. 5A to 5D. When the objective lens 50 is in the just in-focusing state, the beam waist is projected onto the light reflecting layer 24. A minimum-sized beam spot, i.e., the beam waist spot 76 or a spot slightly larger than this spot, is formed on the light reflecting layer 24. Since the laser beam which becomes incident on the objective lens 50 from the laser unit 40 consists of parallel rays, the beam waist is formed at the focal point of the objective lens 50. However, if the laser beam incident on the objective lens 50 from the laser 40 is slightly divergent or convergent, the beam waist is formed in the vicinity of the focal point of the objective lens 50. In the optical system shown in FIGS. 3, 4, and 5A to 5D, photo sensitive regions 78-1 to 78-2 of a photo detecting unit 70 are on or only slightly deviated from the image forming plane of the beam waist spot image 76 in the just in-focusing state. Therefore, in the just in-focusing state, the beam waist spot image or pattern 76 is formed at a position between the photo sensitive regions 78-1 and 78-2 of the photo detecting unit 70, as shown in FIG. 6A. Thus, as shown in FIG. 5A, the beam waist spot image, that is, the pattern 76, is formed on the light reflecting layer 24. The laser beam reflected by the light reflecting layer 24 is converted into parallel light rays by the objective lens 50, and the parallel light rays are directed to the light shielding plate 62. The light component passing through a region spaced apart from the optical axis 64 is extracted by the light shielding plate 62, focused by the projection lens 66, and focused to a minimum diameter on the photo detecting unit 70. Thus, as shown in FIG. 6A, the beam waist spot image or pattern is formed on the photo detecting unit 70. At this time, the levels of the signals from the photo sensitive regions 78-1 and 78-2 of the photo detecting unit 70 are kept substantially the same. When the objective lens 50 draws closer to the light reflecting layer 24, the beam waist is formed after reflection of the laser beam by the light reflecting layer 24, as shown in FIG. 5B. Thus, the beam waist is formed between the objective lens 50 and the light reflecting layer 24. In this defocusing state, the beam waist is generally formed within the focal length of the objective lens 50. As may be apparent, assuming that the beam waist serves as a spot, a laser beam reflected by the light reflecting layer 24 and emerging from the objective lens 50 is converted into a divergent laser beam by the objective lens 50. Since the laser beam component extracted by the light shielding plate 62 is also divergent, even after being converged by the projection lens 66, it is not focused to a minimum size on the photo sensitive regions 78-1 and 78-2 of the photo detecting unit 70, but is focused at a point further away than the photo detecting unit 70. Accordingly, such a laser beam component is projected onto the photo detecting unit 70 in a region above the central point between the photo sensitive regions 78-1 and 78-2. A beam spot image or pattern 77 larger than the beam waist spot image 76 is formed on the photo sensitive regions 78-1 and 78-2. A signal from the first photo sensitive region 78-1 becomes lower in level than that from the second photo sensitive region 78-2. A differential signal of the two signals is generated by the focusing signal generator 72 as a focusing signal. When the objective lens 50 draws even closer to the light reflecting layer 24, an even larger beam spot image or pattern 79 is formed extending beyond the first photo sensitive region 78-1, as shown in FIG. 6C.

Figure 5C:
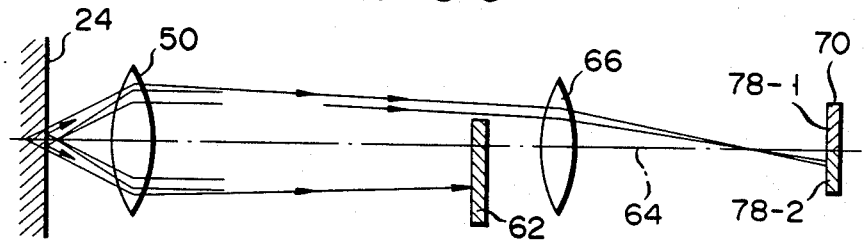
Figure 5D:
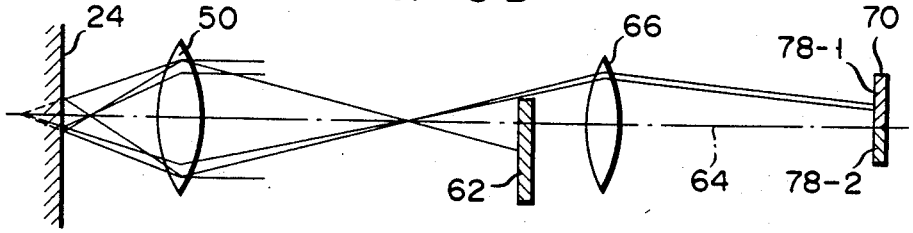
Figure 6A:
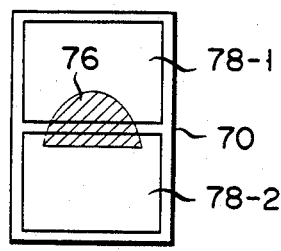
FIGS. 6A, 6B, 6C and 6D show the beam spot images or patterns which are formed on photo sensitive regions of a photo detecting unit shown in FIGS. 5A to 5D.
Figure 6B:
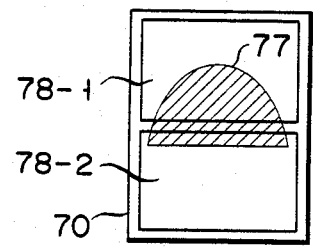
Figure 6C:
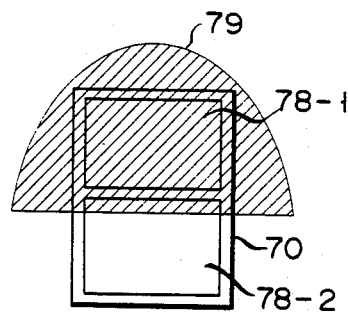
Figure 6D:
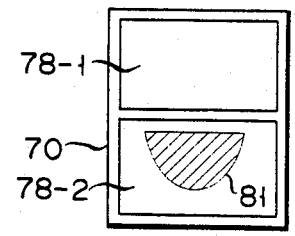

When the objective lens 50 is spaced further apart from the light reflecting layer 24, as shown in FIG. 5C, the laser beam is reflected by the light reflecting layer 24 after forming a beam waist. In such a defocusing state, the focal length of the objective lens 50 generally lies beyond the beam waist which is formed between the objective lens 50 and the light reflecting layer 24. The reflected laser beam directed toward the light shielding plate 62 from the objective lens 50 is thus convergent. The laser beam extracted by the light shielding plate 62 is further converged by the projection lens 66 and is projected onto the photo sensitive regions 78-1 and 78-2 of the photo detecting unit 70 after forming a beam waist spot. As a result, a pattern 81 smaller than the beam waist spot image is formed in the lower portion of the photo sensitive regions 78-1 and 78-2 of the photo detecting unit 70.

When the objective lens 50 is spaced apart from the light reflecting layer 24 by a distance exceeding a predetermined value, a laser beam reflected by the light reflecting layer 24 is focused at a convergent point between the light shielding plate 62 and the objective lens 50. The laser beam diverging from the convergent point is subjected to extraction by the light shielding plate 62, and the extracted component becomes incident on the projection lens 66. Then, as in a case shown in FIG. 5B wherein the objective lens 50 and the light reflecting layer 24 are too close to each other, the divergent laser beam is incident on the projection lens 66 and is projected toward the upper photo sensitive region 78-1. Therefore, even if the lens 50 and the light reflecting layer 24 are spaced far apart from each other, the focusing signal generator 72 may generate a signal indicating that the lens and the light reflecting layer are too close to each other.

Figure 7:
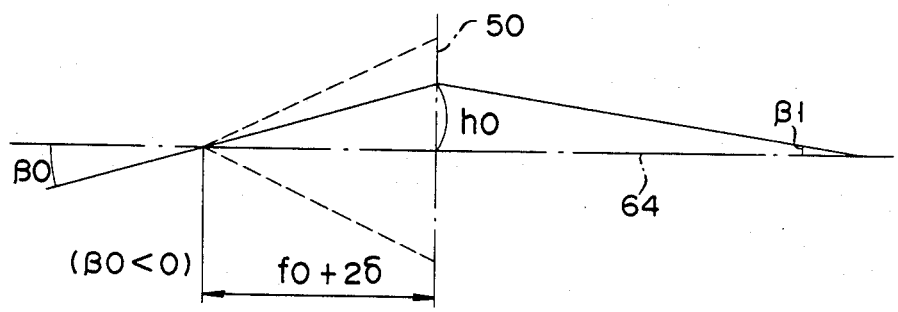
FIG. 7 is a view showing the geometric path of light from a light source passing through the objective lens shown in FIG. 4.

A change in the path of the laser beam can be explained geometrically/optically as follows. A deviation $h_3$ of the laser beam component on the photo detecting unit 70 from the optical axis can be determined. The geometric/optical imaging system of the objective lens 50 is as illustrated in FIG. 7. Referring to FIG. 7, $f_0$ represents the focal length of the objective lens 40 and $\delta$ represents the displacement of the objective lens 50, that is, a change in the distance thereof from the light reflecting layer 24 of the optical disk 12 when a change from the just in-focusing state to the defocusing state is made. In FIG. 7, the laser beam path indicated by the solid line emerges from the beam waist, passes through a point on the principal plane of the objective lens 50 which is a distance $h_0$ away from the optical axis 64, and is focused. In the just in-focusing state shown in FIG. 5A, $\delta = 0$. In the defocusing state shown in FIG. 5B, the objective lens 50 draws closer to the optical disk 12 by the displacement distance $\delta$. Since the beam waist is formed by the laser beam reflected from the light reflecting layer 24, the beam waist comes closer to the objective lens 50 by double the displacement distance $\delta$ (in this case, $\delta < 0$). In the defocusing state shown in FIG. 5C, the objective lens 50 is spaced further apart from the optical disk 12 by the displacement distance $\delta$, and the laser beam is reflected from the light reflecting layer 24 after the beam waist is formed. Accordingly, this is basically similar to the state wherein the beam waist is formed behind the light reflecting layer 24. Thus, the beam waist is spaced apart from the objective lens by the distance $2\delta$. In the just in-focusing state, if the beam waist is formed at the focal point of the objective lens 50 and the objective lens 50 is then moved further apart from the optical disk 12 by the distance $\delta$, the distance between the beam waist and the principle plane of the objective lens 50 is represented by $(f_0 + 2\delta)$. When the beam waist is regarded as a point, angles $\beta_0$ and $\beta_1$ shown in FIG. 7 are given by equations (1) and (2) below:

$$h_0/(f_0 + 2\delta) = \tan(-\beta_0) \approx \beta_0 \qquad (1)$$

From the lens imaging theorem, $$\tan(-\beta_0)/h_0 + \tan\beta_1/h_0 = 1/f_0$$

Therefore, $$\beta_1 = \beta_0 + h_0/f_0 \qquad (2)$$

$$= h_0/(f_0 + f_0^2/2\delta)$$

Figure 8:
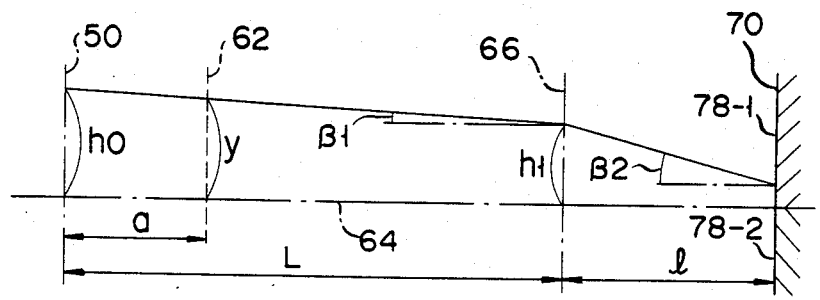
FIG. 8 is a view showing the geometric path of light from a light source passing through a projection lens system shown in FIG. 4.

FIG. 8 shows the geometric path of light in the optical system of the projection lens 66. It is assumed here that the projection lens 66 comprises a pair of combined lenses 66-1 and 66-2.

It is also assumed that the respective lenses 66 have focal lengths $f_1$, the light shielding plate 62 is arranged at a distance $a$ from the principal plane of the objective lens 50, the principal plane of the lens 66-1 is arranged at a distance L from that of the objective lens 50, the principal plane of the lens 66 is arranged at a distance $l$ from the photo sensitive regions 78-1 and 78-2 of the photo detecting unit 70. The path indicated by the solid line is the path of light rays which are converged by the objective lens 50 and which then pass through the light-transmitting plane of the light shielding plate 62, the edge of which is apart from the optical axis at a distance $y$.

The distance $y$ is given by equation (3) below:

$$y = h_0 - a\beta_1 \qquad (3)$$

$$= h_0\{1 - a \cdot 1/(f_0 + f_0^2/2\delta)\}$$

If we assume $F(\delta) = (f_0 + f_0^2/2\delta)^{-1}$, equation (3) can be rewritten as:

$$y = h_0(1 - aF(\delta)) \qquad (4)$$

Therefore, $$h_0 = y/(1 - aF(\delta)) \qquad (5)$$

A distance $h_1$ of the path of the transmitted light component from the optical axis 64 at the principal plane of the lens 66 is given by equation (6) below:

$$h_1 = y - (L - a)\beta_1 \qquad (6)$$

$$= \{(1 - LF(\delta))/(1 - aF(\delta))\} \cdot y$$

Angle $\beta_2$ can be calculated in a similar manner as in the case of angle $\beta_1$ in equation (2) as follows:

$$\beta_2 = \beta_1 + h_1/f_1 \qquad (7)$$

$$= \{y/(1 - aF(\delta))\}\{1/f_1 + (1 - L/f_1)F(\delta)\}$$

The distance or deviation $h_2$ from the optical axis 64 of the transmitted light component at the photo sensitive region of the photo detecting unit 70, and an incident angle $\beta_3$ thereat are given by equations (8) to (10) below:

$$h_2 = h_1 - l\beta_2 \qquad (8)$$

$$= \{y/(1 - aF(\delta))\}\{(1 - l/f_1) - [l + L(1 - l/f_1)] \times F(\delta)\}$$

When $l = f$, equation (8) can be rewritten as:

$$h_2 = \frac{-y \cdot f_1 \cdot F(\delta)}{1 - aF(\delta)} \qquad (9)$$

$$= \frac{f_1 y}{(a - f_0) - f_0^2/2\delta}$$

If the projection lens 66 is a single lens in the optical system shown in FIG. 8, since f2=∞ and f1=1, and $$h2 = \mp ly/(a - f0 - f0^2/2\delta) \tag{10}$$

$$= \mp mf0 \cdot y/(a - f0 - f0^2/2\delta)$$

Figure 10:
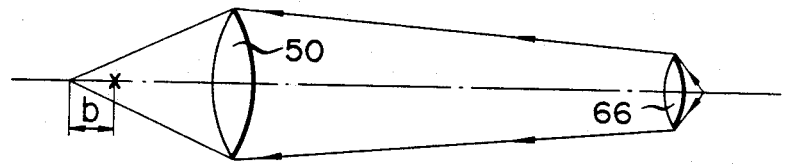
FIG. 10 is a diagram showing the path of the light when the beam spot or waist is not formed at the focal point of the objective lens but at a position deviated slightly therefrom.

In the optical system shown in FIG. 7, it is assumed that the beam waist is formed at the focal point of the objective lens 50. However, when a divergent or convergent laser beam is incident on the objective lens 50, the position of the beam waist is deviated from the focal point of the objective lens 50 by a distance b, as shown in FIG. 10.

Figure 9:
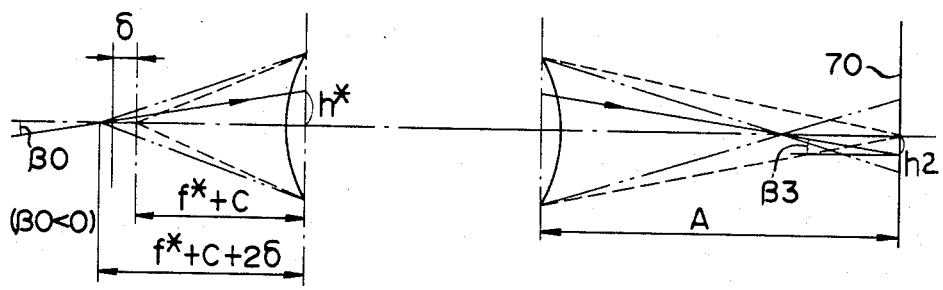
FIG. 9 is a view showing the geometric path of light when the lenses shown in FIGS. 7 and 8 are replaced with a single synthetic lens.

When it is assumed that the lens system for processing the light which is reflected by the light reflecting layer 24 of the optical disk 12 and reaches the photo detecting unit 70 through the objective lens 50 and the projection lens 66 is a single compound lens, the calculation to be described below can be performed in place of the calculation described above. That is, the optical path of the reflected light obtained when the beam waist position is deviated from the focal point of the objective lens 50 by the distance δ is calculated in accordance with equations up to equation (22), assuming that the focal lenght of the single compound lens is f* and the distance from the front focal point of the single compound lens to the optical disk 12 when the just in-focusing state is established (focused laser beam) as C. When the projection lens 66, a detection lens 73, and the like are all considered as a single synthetic lens, we have from FIG. 9:

$$h^*/(f^*+C+2\delta) = \tan(-\beta 0) \approx -\beta 0$$

Thus, $$h^* = -\beta 0 \cdot (f^* + C + 2\delta) \tag{11}$$

Also, $$\beta 2 = \beta 0 + h^*/f^* = \{\beta 0 - \beta 0 - (C + 2\delta)\beta 0/f^*\} \tag{12}$$

$$= -\beta 0(C + 2\delta)/f^*$$

When the second photo detecting unit 70 is arranged at the image forming plane when the focused point of the laser beam and the position of the light reflecting layer 24 of the optical disk 12 coincide with each other (when δ=0), we have h2=0. The transverse multiplication factor m at this time is obtained from $\pm m = -\beta 0/\beta 2$ to be $m = \pm f^*/C$.

Therefore, $$C = \pm f^*/m \tag{13}$$

Note that m is assumed to be always a positive number. Thus, +m represents the case of an inverted image, and −m represents the case of an erect image.

When the distance from the rear principal point of the compound lens to the second photo detecting unit 70 is represented by A, we have:

$$h2 = h^* - A\beta 3 \tag{14}$$

$$= \beta 0\{(\pm A/m - f^* \mp f^*/m) + (A/f^* - 1) \times 2\delta\}$$

For any value of β0 and for δ=0, from h2=0, we have:

$$A = f^*(1 \pm m) \tag{15}$$

Substitution of equation (15) in equation (14) provides:

$$h2 = \beta 0\{f(1 \pm m)/f^* - 1\} \times 2\delta \tag{16}$$

$$= \pm 2m\delta \times \beta 0$$

Substitution of equations (1) and (5) in equation (16), following equations (17) and (18) are established.

$$h2 = \mp mf0y/(a - f0 - f0^2/2\delta) \tag{17}$$

$$h2 = \pm (2my/f0)\delta \tag{18}$$

As shown in FIG. 10, when laser beam incident on the objective lens 50 is convergent or divergent, and the focused point of the laser beam is deviated from the focal point of the objective lens 50 by the distance b, conversion in equations (1) to (9) of:

$$2\delta \rightarrow 2\delta + b$$

allows establishment of the proper equations. Accordingly, from equation (5), we have:

$$h0 = \{[f0 + f0^2/(2\delta+b)]/[f0 + f0^2/(2\delta+b) - a]\} \times y \tag{19}$$

Substitution of equation (19) in equation (1) yields:

$$\beta 0 = -h0/(f0 + 2\delta + b) \tag{20}$$

$$= -[f0 \cdot h0/(2\delta + b)]/[f0 + f0^2/(2\delta + b)]$$

$$= f0 \cdot y/\{(2\delta + b)/[f0 + f0^2/(2\delta + b) - a]\}$$

$$= -f0 \cdot y/\{f0^2 + (f0 - a)(2\delta + b)\}$$

$$= -y/\{f0 + (1 - a/f0)(2\delta + b)\}$$

Substitution of equation (20) in equation (16) provides:

$$h2 = \mp 2my\delta/\{f0 + (1 - a/f0)(2\delta+b)\} \tag{21}$$

If a=0, $$h2 = \mp 2my\delta/(f0 + b + 2\delta) \tag{22}$$

If f0+b >> 2δ, $$h2 \approx \mp 2my\delta/(f0+b) \tag{23}$$

Equations (9), (10), (14), (16), (17) and (18) indicate that when the focal point of the objective lens 50 is deviated from the light reflecting layer 24 of the optical disk 12 by the distance δ, the beam spot formed on the photo sensitive regions 78-1 and 78-2 of the photo detecting unit 70 is geometrically deviated from the optical axis 64 for the distance h2.

All of the above equations relate to the geometric/optical calculation of the light path. Accordingly, when δ=0 is substituted in the above equations, we have h2=0. However, in practice, there is an influence of diffraction from the wave characteristics of light. Accordingly, even when δ=0 (just in-focusing state), the beam spot formed on the light reflecting layer 24 of the optical disk 12 and the spot size on the photo detecting unit 70 do not become zero and have certain values. These sizes can be calculated in the following manner.

When parallel laser beams having a uniform intensity distribution are incident on an ideal lens having no aberration and a numerical aperture (NA) of a value NA, a spot size al at the focused point after this lens is generally given by:

$$al = 0.82\lambda/NA \qquad (24)$$

where $\lambda$ is the wavelength of the laser.

Figure 11:
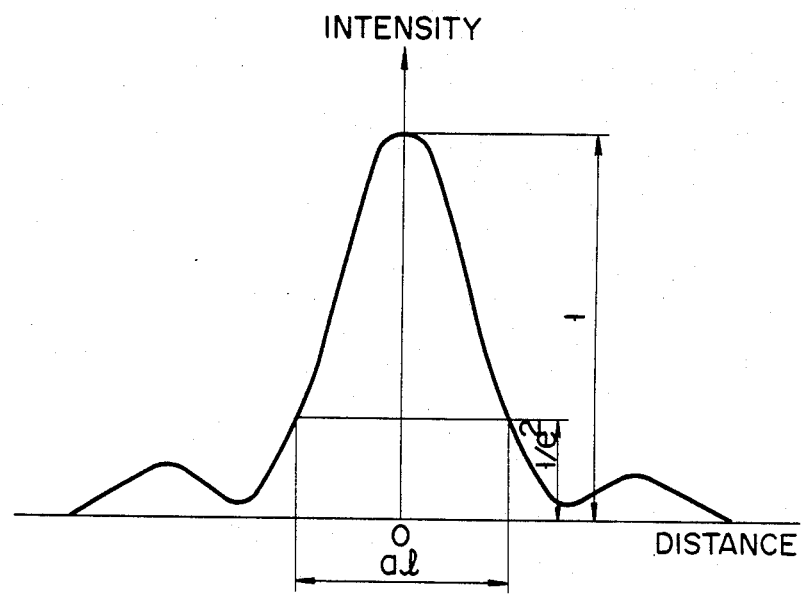
FIG. 11 shows the distribution of light intensity at the beam waist.

Note that al represents the diameter of a circle having an intensity of $1/e^2$ when the intensity at the center of the spot is defined as 1, as shown in FIG. 11. When it is assumed that the beam spot corresponds to the beam waist formed by the objective lens 50, a size ad of the beam waist image formed on the light-receiving surfaces or the image forming plane of the second photo detecting unit 70 in the just in-focusing state is represented by a transverse multiplication factor m of the lens system having the lenses 50 and 66 as follows:

$$ad = mal = 0.82m\lambda/NA \qquad (25)$$

The spot shape changes in the manner described below when the light shielding plate 62 is arranged in the optical path. First, when the light shielding plate 62 is not arranged in the optical path and parallel light beams having a uniform intensity, that is, an intensity distribution $rec(X/a)$ become incident on the projection lens 66, a pattern having an amplitude $a \sin c(a\xi)$ which has been Fourier-transformed is formed on the light-receiving surfaces of the second photo detecting unit 70. Thus, $$F\{rec(X/a)\} = a \sin c(a\xi)$$

Intensity IO is given by:

$$IO = |a \sin c(a\xi)|^2 \qquad (26)$$
$$= \sin^2(\pi a\xi)/\pi^2\xi^2$$

Figure 13:
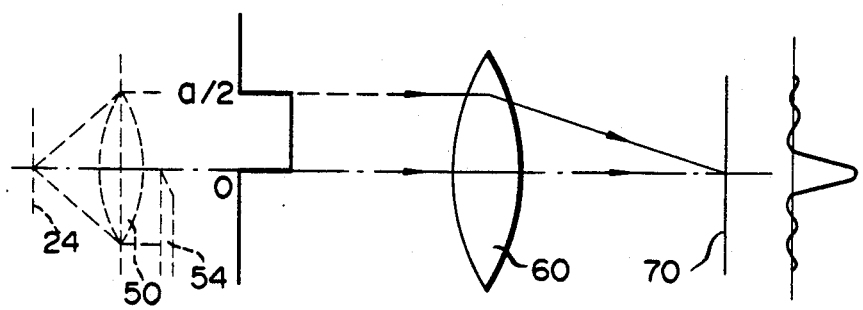

In this state, it is assumed that the light shielding plate 62 is placed in the optical path, and half of the light rays are shielded as shown in FIG. 13. At this time, the pattern formed on the light-receiving surfaces of the second photo detecting unit 70 has an amplitude distribution $\xi$ obtained by Fourier-transforming as follows:

$$\int_0^{a/2} e^{-i2\pi\xi x}dx \frac{\{a \sin(a\pi\xi) - 1\} - i \sin(a\pi\xi)}{-i 2\pi\xi}$$

Therefore, an intensity distribution Ik is given by:

$$Ik = \sin^2(\pi a\xi/2)/\pi^2\xi^2 \qquad (27)$$
$$= (a^2/4)\sin c^2(a\xi/2)$$

From a comparison of equations (26) and (27), it is seen that when half of the parallel light rays are shielded by the light shielding plate 62, the central position of the spot does not change but the spot size is doubled. From this, in a one-dimensional model, when the ratio of light rays which are not shielded but are transmitted by the light shielding plate 62 is represented by R, the spot size is increased by 1/R times. Accordingly, in a one-dimensional model, when the light shielding plate 62 is inserted in the optical path and the light is transmitted in the ratio R (area ratio), a spot is formed on the light receiving surfaces of the second photo detecting unit 70, which has an increased diameter ak given below in the direction parallel to the inserting direction of the plate 62:

$$ak = ad/R = 0.82m\lambda/R \cdot NA \qquad (28)$$

The light rays which pass through the outer periphery of the objective lens 50 having a diameter A are directed to a point on the light-receiving surfaces of the second photo detecting unit 70 which is at a distance D from the optical axis, when $y = A/2$ is substituted in the equation (23).

$$D(\delta) \approx \pm mA/(f0+b)\delta \qquad (29)$$

As may be apparent from a comparison of equations (28) and (29), detection sensitivity is lowered when the distance between the optical axis and the point on the photo detecting unit 70 to which the light rays directed through the outermost periphery of the objective lens 50 is smaller than the radius of the diffraction pattern formed on the photo sensitive regions of the second photo detecting unit 70. Thus, under the conditions of equations (30) and (31) given below, the detection sensitivity is lowered:

$$|D(\delta)| \leq ak/2 \qquad (30)$$

Thus, $$|A\delta/(f0+b)| \leq 0.41\lambda/R \cdot NA \qquad (31)$$

When a minimum defocusing amount $\delta c$ to be detected is given, a ratio H (area ratio) at which the light shielding plate 62 is inserted in the optical path, and the transmitting ratio R thereof are determined:

$$|A\delta c/(f0+b)| \geq 0.41\lambda/R \cdot NA$$
$$R \geq 0.41\lambda(f0+b)/(NA \cdot A \cdot \delta c) \qquad (32)$$

Therefore, $R + H = 1$ (the light rays are completely shielded when $R = 0$ and $H = 1$.)

When a distance between the principal point of the objective lens 50 at the side of the optical disk 12 and the focused point (beam waist position) is given to be F, inequality (32) is rewritten in accordance with condition $F = f0 + b$, as follows:

$$R \geq (0.41\lambda F)/(NA \cdot A \delta c)$$

When the ratio R is given as described above, the diffraction effect does not occur even in the almost just in-focusing state. Therefore, a high defocusing detection sensitivity can be provided.

The light shielding plate 62 may be replaced by an aperture, a slit, a prism, a mirror, a lens or the like. It should be noted that R means a ratio of light transmitted through the light shielding plate 62 along a one-dimensional direction to the total incident light. When the photo detecting unit for detecting the defocusing state is arranged to receive light rays reflected or refracted by the mirror or the prism replacing the light shielding plate 62, the ratio R is given along one-dimensional direction which corresponds to the direction along which part of the light rays is extracted by the mirror, or the direction along which the light rays are refracted.

A maximum defocusing allowance beyond which the defocusing amount δc need not be detected will be discussed. When the laser beam having a uniform light intensity is projected on the objective lens 50 and is converged on the light reflecting layer 24 of the optical disk 12, this convergent point has a light intensity distribution which is given to be the Airy disk pattern represented by the Bessel function. This pattern has a diameter $al = 0.82\lambda/NA$ which provides an intensity of $1/e^2$ when the central light intensity is given as 1, as is represented by equation (32), where NA is the numerical aperture of the objective lens and λ is the wavelength of the laser beam.

A light intensity at the optical axis on a plane which is spaced by a distance Z from the convergent point is known to be given by:

$$I(Z) = I0\{\text{sin-}c[(\pi/2)(NA \cdot Z/\lambda)]\}^2 \tag{32}$$

A distance ΔZ between the convergent point and a given position at which the central light intensity is 80% of the central light intensity at the convergent point is generally defined as a focal depth and given as follows:

$$\Delta Z = \pm \lambda/2(NA)^2 \tag{33}$$

In the optical head, pits are formed in the light reflecting layer 24 in accordance with the laser beam with a high light intensity or power, thereby recording information in the optical disk 12. The present inventor finds that the maximum allowance for the defocusing amount δc is substantially the same as the focal depth. Accordingly, the following equation is established.

$$\delta c = \pm \lambda/2(NA)^2 \tag{34}$$

The same consideration as described above can be applied when a laser beam which does not have a uniform light intensity distribution but has the Gauss distribution is projected on the objective lens 50. In other words, a spot radius ω0 at the convergent point is given as follows:

$$\omega 0 \approx (2/\pi)(\lambda/NA) \tag{35}$$

A radius ω(Z) of the beam spot which is spaced apart from the convergent point by the distance Z is given by:

$$\omega(Z) = \omega 0 \sqrt{1 + (\lambda Z/\pi \omega 0^2)^2} \tag{36}$$

The focal depth ΔZ is given as follows and corresponds to the maximum defocusing allowance δc:

$$\Delta Z = \delta c = \pm \lambda/\pi(NA)^2 \tag{37}$$

The defocusing amount δc is considered from another viewpoint. When the light reflecting layer (recording layer) 24 of the optical disk 12 is subjected to a state change such as formation of pits, it is very difficult to perform recording when defocusing occurs to increase the spot size and the central light intensity of the spot decreases. A spot size al on the light reflecting layer 24 in the just in-focusing state is given by equation (24). In this case, if the intensity distribution resembles the Gauss distribution, the radius ω(Z) of the spot on the light reflecting layer 24 in the defocusing state is given by equation (38):

$$\omega^2(Z) = \omega 0^2\{1 + (\lambda Z/\pi \omega 0^2)^2\} \tag{38}$$
$$= \omega 0^2\{1 + ((NA)^2/0.17\pi\lambda)^2 \cdot Z^2\}$$

In this case, the central light intensity of the spot is decreased as follows:

$$I = \{\omega 0/\omega(Z)\}^2 \tag{39}$$

when a minimum central light intensity of the spot which allows recording is given to be Imin, $$Imin \leq \{1 + ([NA]^2/0.17\pi\lambda)^2 \cdot Z^2\}^{-1} \tag{40}$$

Therefore, $$1 + ([NA]^2/0.17\pi\lambda)^2 \cdot Z^2 \leq 1/Imin \tag{41}$$
$$([NA]^2/0.17\pi\lambda)^2 \cdot Z^2 \leq -1/Imin - 1$$

$$|\delta c| = |Z| \leq \{0.17\pi\lambda/(NA)^2\}\sqrt{1/Imin - 1}$$

Now assume that $\lambda a = 0.83$ μm, NA = 0.6 and Imin = 0.7. The above inequality can be rewritten as follows:

$$|\delta c| = Z \leq (0.44/0.36)\sqrt{0.4286} = 0.81 \text{ μm}$$

On the other hand, when it is assumed that λ = 0.83 μm, NA = 0.5 and Imin = 0.7, $$|Z| \leq (0.44 \times 0.36)/0.25 = 1.16 \text{ μm}$$

The defocusing allowance δc falls within the range of 0.5 to 2.0 μm.

Figure 14:
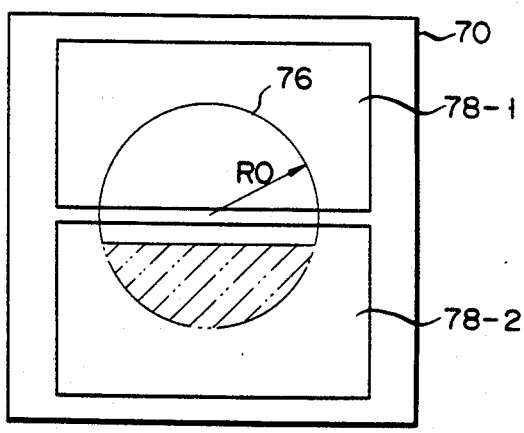
FIG. 14 is a representation for explaining the size of the beam spot formed on the photo sensitive regions of a photo detecting unit.

When the minimum defocusing amount δc is substituted in the denominator of equation (22), relation h3 = R0 is obtained. Therefore, equation (42) is established as follows:

$$R0 = 2my\delta c/(F \pm 2\delta c) \tag{42}$$

where R0 is the radius of the beam spot formed on the light receiving surfaces of the photo detecting unit 70 when the light shielding plate 62 is inserted in the optical system in the defocusing state, as shown in FIG. 14. It should be noted that the light receiving surfaces of the photo detecting unit 70 are placed on the image forming plane of the beam waist formed by the objective lens 50 so that the beam waist image is formed on the light receiving surfaces in the just in-focusing state. In equation (42), F is the distance between the focused point (beam waist position) and the principal point of the objective lens which is located on the side of the data recording medium, y is the radius of the exit pupil of the objective lens or the radius of the aperture of the objective lens, m is the focused image multiplication (transverse multiplication) on the photo detecting unit, and δc is the defocusing allowance (deviation allowance of a distance between the standard objective lens and the light reflecting layer).

As is understood from FIG. 14, unless the beam spot is partially located outside the photo sensitive regions 78-1 and 78-2, the defocusing state can be stably and accurately detected. The photo detecting unit 70 must have a large sensing area having a greater radius than that of a circle given as follows:

$$R0 = \{2my/(F \pm \delta c)\} \times \delta c \text{ ($\delta c$ is preferably 0.002 mm)}$$

Now assume that the light receiving surfaces of the photo detecting unit 70 are arranged to be deviated from a plane (i.e., image forming plane) on which a beam waist image is formed by the objective lens 50 and the projection lens 66.

When light having a circular section and a uniform distribution is incident on the lens of the detecting system, the focal depth Z of the focusing system is given as $Z = (1/2)(f/a)^2 \lambda$. However, when light having the Gauss distribution is incident on the lens of the detecting system, the focal depth Z is given as $Z = (1/\pi)(f/a)^2 \lambda$. In these relations, f is the focal length of the detecting system lens made of a single lens or a compound lens, a is the radius of an incident beam spot at the front-side principal point (located on the side of the objective lens) of the lens (or a lens group) for detecting the just in-focusing state, and $\lambda$ is the wavelength of the used light beam. Therefore, the light receiving surfaces of the photo detecting unit can be greatly displaced exceeding the focal depth Z. In practice, the intensity distribution of the light beam incident on the detecting system lens varies in accordance with the types of optical systems. In any case, the light receiving surfaces of the photo detecting unit 70 must be displaced by a distance greater than $Z = (1/\pi)(f/a)^2 \lambda$.

The influence of the diffraction of light on the defocusing detection sensitivity will now be described with reference to FIGS. 15A to 15C. Referring to these figures, reference numeral 70A denotes a photo detecting unit which is located at a position between the projection lens 66 and the focal point thereof, and reference numeral 70B denotes a photo detecting unit which is located at a position farther than the focal point of the projection lens 66. When a slight defocusing occurs, a semicircular spot portion having a radius of $h3 = 2mr\delta/(f0+b)$ (where r is the radius of the aperture of the objective lens 50) is formed on the photo detecting unit 70 arranged at the image forming plane, as may be seen from equation (23) above. This semicircular spot portion is detected by one photo sensitive region to detect the defocusing. However, in the just in-focusing state, this semicircular spot portion has a spot size of $0.82m\lambda/R \cdot NA$ as seen from equation (28) due to the influence of the diffraction of light. For this reason, detection sensitivity is degraded near the just in-focusing state, that is, in the range given by equation (31) above. This phenomenon may be explained in terms of physics as follows.

Figure 12:
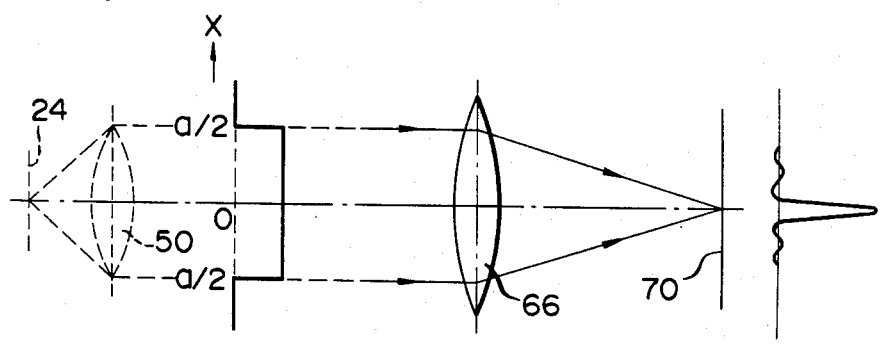
FIGS. 12 and 13 show the distribution of light intensity from the viewpoint of wave optics.
Figure 15A:
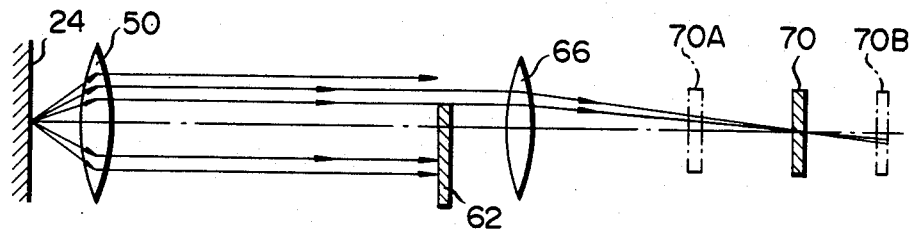
FIGS. 15A, 15B and 15C are views showing the paths of light beams according to another embodiment of the present invention when the photo detecting unit is not located on the image forming plane.
Figure 15B:
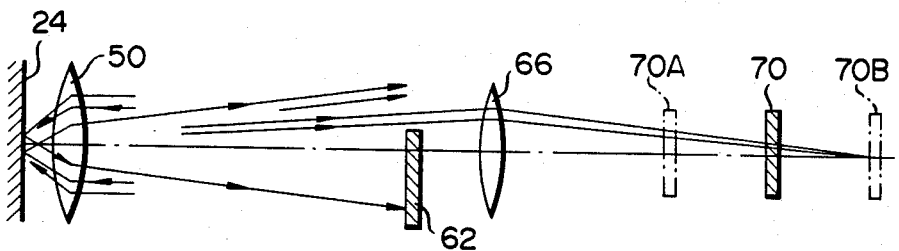
Figure 15C:
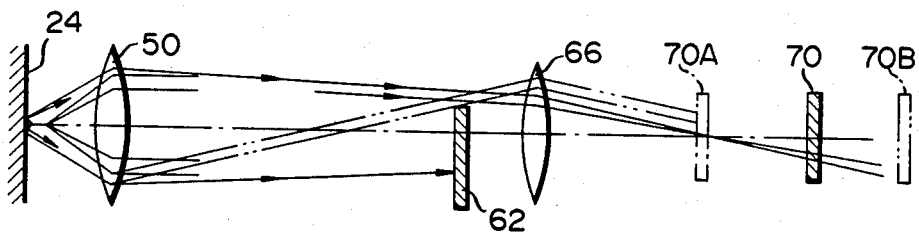
Figure 16:
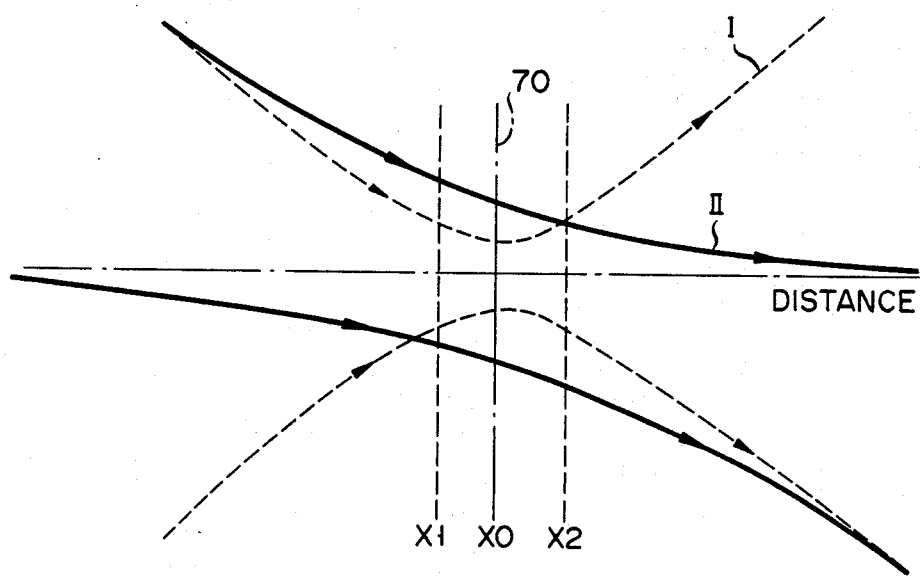
FIG. 16 shows the path of a laser beam passing through the image forming plane.
Figure 17:
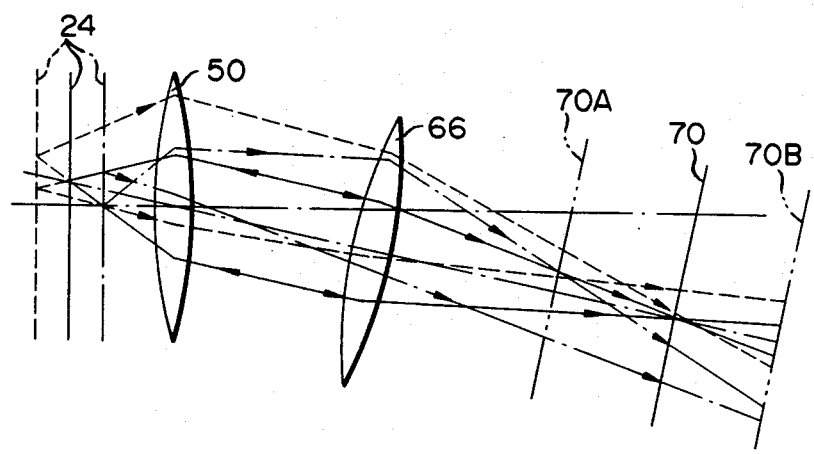
FIGS. 17, 18, 19 and 20 and FIGS. 21A and 21B show optical systems according to various modifications of the present invention.
Figure 18:
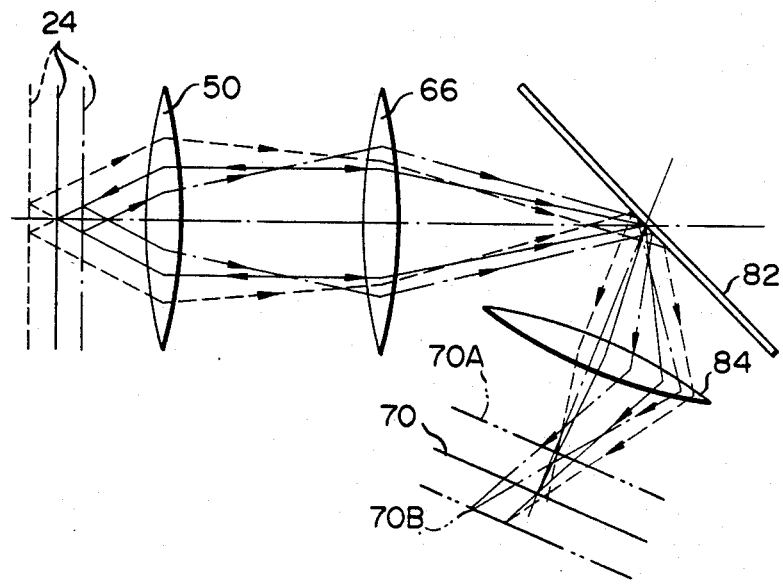
Figure 19:
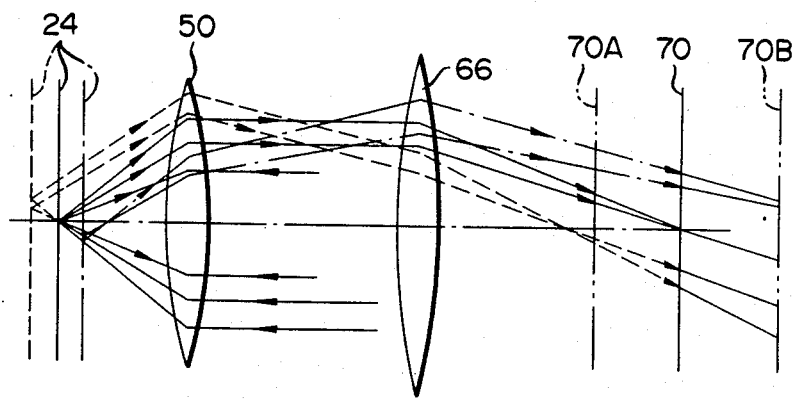

In the optical system shown in FIGS. 15A to 15C, the light rays emerging from the objective lens 50 and directed toward the projection lens 66 do not actually have a uniform intensity but has a Gaussian distribution, as shown in FIGS. 12 and 13. Therefore, the light rays having a distribution as shown in FIG. 16 become incident on the light-receiving surfaces of the second photo detecting unit 70. Referring to FIG. 16, the path indicated by broken line I corresponds to a case wherein the light shielding plate 62 is not inserted in the path of light rays at all. The path indicated by solid line II corresponds to a case wherein the light shielding plate 62 is inserted in the optical path. In the just in-focusing state, the light-receiving surfaces of the second photo detecting unit 70 are positioned at a position X0. In the defocusing state, the light-receiving surfaces of the second photo detecting unit 70 are positioned at a position X1 or X2. It is seen from FIG. 16 that when slight defocusing occurs, the detection sensitivity of the second photo detecting unit 70 is lower than the estimated value. In the state close to the just in-focusing state, that is, when a slight defocusing occurs, the light-receiving surfaces of the second photo detecting unit 70 are displaced between the positions X1 and X2. However, within this range, a projection position of light rays II only slightly changes, and a detection error is extremely small as compared to that obtained when the light-receiving surfaces of the second photo detecting unit 70 fall outside the range between the positions X1 and X2. Within this range, the diverging angle of the light rays I is also small as compared to the case wherein the light-receiving surfaces of the unit 70 do not fall within this range. As may be seen from the paths of the light rays I and II shown in FIG. 16, the pattern formed on the light-receiving surfaces of the photo detecting unit is deviated along the direction of insertion of the light shielding plate 62 in accordance with the defocusing amount $\delta$, and extends in a direction perpendicular to this insertion direction.

The deviation of the position of the second photo detecting unit 70 from the focal point of the objective lens 50, which results in ideal optical behavior free from the influence of the wave optics will be considered. In general, the light intensity distribution at the convergent point is different depending upon the optical system used. However, a case of an optical system having a Gaussian distribution will be considered. When the beam spot radius at the convergent point (beam waist) of the projection lens 66 is repesented by $\omega_0$ and the wavelength of light is represented by $\lambda$, a beam spot diameter $\omega(Z)$ at a a distance Z from this focused point (beam waist) is given by:

$$\omega(Z) = \omega_0 \sqrt{1 + (\lambda Z/\pi \omega_0^2)^2} \tag{36}$$

Where Z is relatively large, an approximation:

$$\omega(Z) = \omega_0 \sqrt{1 + (\lambda Z/\pi \omega_0^2)^2} \tag{43}$$

$$\approx \lambda Z/\pi \omega_0 + (\tfrac{1}{2})(\pi \omega_0^3/\lambda Z)$$

can be obtained. The first term of this equation represents the geometrical/optical behavior, and the second term represents the spot extension due to the wave optics. Therefore, when the value of the first term is 4 times or more that of the second term, substantially geometrical/optical behavior is obtained.

As a condition for:

$$\lambda Z/\pi \omega_0 \geq 4 \times (1/2)(\pi \omega_0^3/\lambda Z)$$

from $$Z^2 \geq 2(\pi \omega_0^2/\lambda)^2$$

we obtain:

$$Z \geq \sqrt{2} \times \pi \omega_0^2/\lambda \tag{44}$$

When the radius of a beam spot formed by the objective lens 50 is represented by $\omega_0^*$ and the imaging transverse multiplication of the optical system is represented by m, in the optical system shown in FIGS. 17 to 20, the radius $\omega_0$ of the beam waist formed by the projection lens 66 becomes approximately equal to $m\omega_0^*$. An ideal theoretical value is obtained by calculating $\omega_0 \approx 0.41 m\lambda/NA$ using the equation $\omega_0^* = a l/2 = 0.41\lambda/NA$ given by equation (24), and by using the relation $Z \geq \sqrt{2\pi\omega_0^2/\lambda}$ described above.

Figure 20:
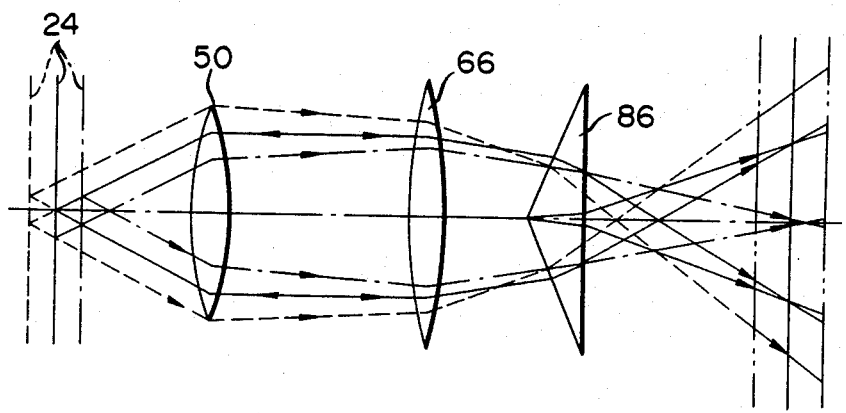
Figure 21A:
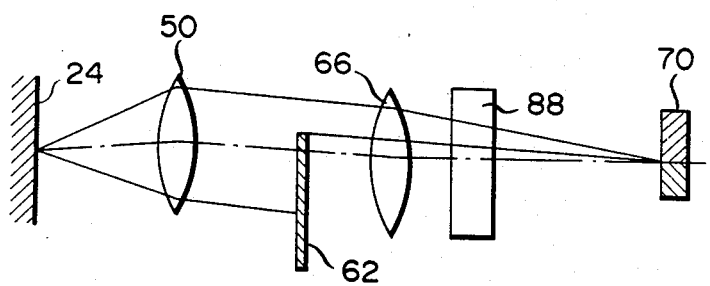
Figure 21B:
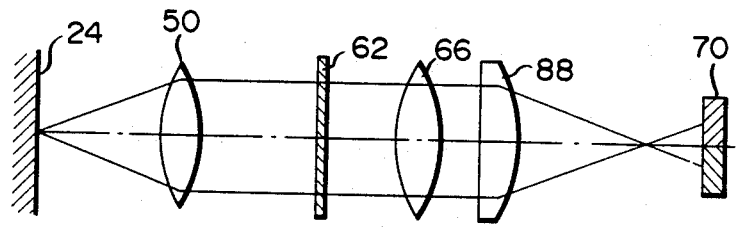

In the optical system shown in FIGS. 4 and 20 or that shown in FIGS. 21A and 21B, an ideal theoretical value can be obtained from $\omega_0^* = ak/2 = 0.41 m\lambda/R \cdot NA$ given by equation (28) and the relation $Z \geq \sqrt{2\pi\omega_0/\lambda}$.

The optical systems shown in FIGS. 17 to 20 will be described briefly. In the optical system shown in FIG. 17, the optical axis of the objective lens 50 and that of the projection lens 66 are not common and cross each other. In the optical system shown in FIG. 18, a mirror 82 and a convergent lens 84 are used in place of the light shielding plate 62. In the optical system shown in FIG. 19, the laser beam passing through a region spaced apart from the optical axis is projected onto the objective lens 50. In the optical system shown in FIG. 20, a biprism 86 is used in place of the light shielding plate 62. These optical systems are described in detail in U.S. Pat. No. 4,521,680 and EPC Application No. 82106508.3, and a reference to them must be made for further details. Both documents being incorporated herein by reference. In the optical system shown in FIGS. 21A and 21B, a cylindrical lens 88 is arranged between the projection lens 66 and the photo detecting unit 70. The longitudinal axis of the projection lens 66 is parallel to the insertion direction of the light shielding plate 62. This optical system is described in U.S. Pat. No. 4,585,933, and EPC Application No. 82108269.0, filed on Sept. 8, 1982, and a reference to them must be made for further details. Both documents being incorporated herein by reference.

Since $Z = (f/a)^2 \lambda$, equation (45) below is obtained:

$$(f/a)^2 \lambda \geq \sqrt{2}\, \pi\omega_0^2/\lambda \quad (45)$$

This equation (45) will be considered.

When parallel light rays of a uniform intensity distribution become incident on the detection system lens in the just in-focusing state, when a convergent angle is represented by $2\theta$, the diameter d0 of the spot at the focused point can be given by:

$$d0 = 2\omega_0 \approx 2\lambda/\pi\theta$$

When the angle $\theta$ is sufficiently small, from $\theta = a/f$, we have:

$$(1/\pi)(f/a)^2\lambda = \pi\omega_0^2/\lambda < \sqrt{2}\,\pi\omega_0^2/\lambda < \sqrt{2}\,\pi\omega_0'^2/\lambda$$

where $\omega_0$, is the beam spot radius when the equation (37) is used.

When the second photo detecting unit 70 is arranged at a position deviated from the image forming plane in the just in-focusing state, it may be shifted toward or away from the projection lens along the optical axis. However, when the second photo detecting unit 70 is shifted toward the detection system lens or the projection lens 66, the overall apparatus becomes more compact in size.

Figure 22A:
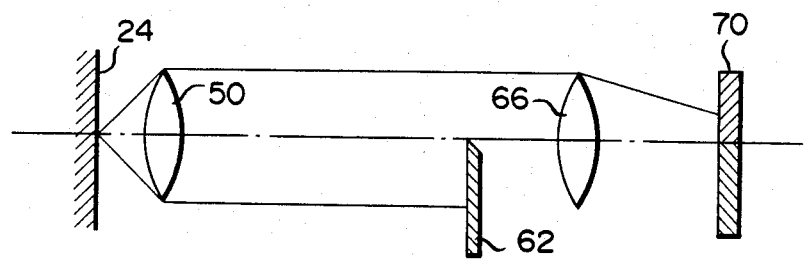
FIGS. 22A and 22B show an optical system and the corresponding pattern on the photo sensitive regions when the photo sensitive regions of the photo detecting unit are deviated from the image focal plane.
Figure 22B:
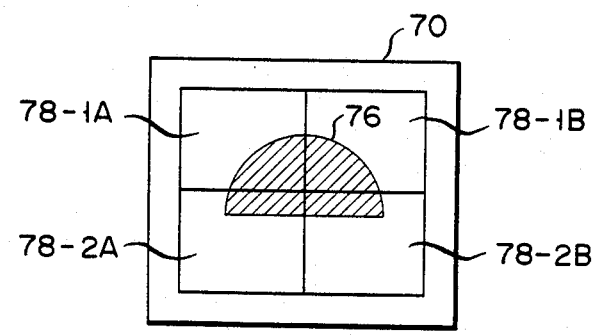

Next, an optical system as shown in FIG. 22A will be described. In this optical system, the second photo detecting unit 70 is significantly shifted from the focal point of the projection lens 66, and a tracking error is detected by a single photo detecting unit 70. In this optical system, as shown in FIG. 22B, the photo detecting unit 70 comprises four photo sensitive regions 78-1A, 78-1B, 78-2A and 78-2B. When detection signals from these photo sensitive regions 78-1A, 78-1B, 78-2A and 78-2B are respectively represented by S1, S2, S3 and S4, the calculation of:

$$(S2+S4)-(S2+S3)$$

is electrically performed to detect a defocusing amount, and the calculation of:

$$(S1+S2)-(S3+S4)$$

is electrically performed to detect a tracking error. Accordingly, in this system, the "Push-Pull method" is adopted for detection of the tracking error. More specifically, a light diffraction pattern reflected from the light reflecting layer or recording layer 24 of the optical disk 12 having a fine projecting or recessed pattern therein is electrically observed so as to detect any tracking error. However, when the "Push-Pull method" is adopted, if the photo sensitive surfaces of the photo detecting unit 70 are located at a site of formation of a far field pattern for the light reflecting layer 24, a large tracking error detection signal is obtained. In contrast to this, when the photo detecting unit 70 is located at the site of the image pattern, almost no tracking error detection signal is obtained. Therefore, in the optical system shown in FIG. 22B, the photo detecting unit 70 is preferably arranged close to the site of formation of the far field pattern. However, in an optical system wherein the photo detecting unit is located at the site of formation of the far field pattern and the defocusing amount and tracking error are simultaneously detected, a pattern disturbance formed on the far field plane (which is caused when the laser spot crosses the continuous tracking guide) causes disturbance of the defocusing detection signal. This degrades the defocusing detection sensitivity. This disadvantage is caused in the optical system shown in FIG. 22A. Thus, the photo detecting unit 70 must not be arranged on the far field plane. From many experiments conducted, it has been confirmed that even if the laser spot crosses the tracking guide having the projecting or recessed shape on the recording layer 24 of the optical disk 12, an error signal which may adversely affect the defocusing detection may not be generated. When the far field plane corresponds to the Franhoffer region, the photo detecting unit 70 must be located at a position which is closer to the image forming plane than is the boundary between the Fresnel region and Fraunhoffer region. When a spot size d0 at the focal point of the projection lens 66 is defined as the width (diameter) at which the intensity becomes $1/e^2$ (where the central maximum intensity is 1), the actual beam spot has a size extension of about 3.9d0. The size of 3.9d0 corresponds to the range including the dark ring outside the second-order peaks of the Airy pattern. Since the boundary between the Fraunhoffer and Fresnel regions for the pattern having such an extension is approximately given by $(3.9d0)^2/\lambda$, the distance between the focal point of the projection lens 66 and the photo detecting unit 70 is preferably less than at least $(3.9d0)^2/\lambda$ in the just in-focusing state.

The beam spot behavior on the photo detecting unit in the defocusing state will now be examined. Equations up to (23) are for a case wherein the second photo detecting unit 70 is arranged at the image forming plane on the light reflecting layer 24 of the optical disk 12. Similarly, equations for a case wherein the second photo detecting unit 70 is arranged at a position deviated from the image forming plane on the light reflecting layer 24 of the optical disk 12 will now be obtained. The overall optical system will be considered as a compound lens. In the just in-focusing state, that is, when the focal point of the objective lens 50 coincides with the light reflecting layer 24 of the optical disk 12, the distance A0 between the rear principal point of the compound lens and the focal point thereof is given from equation (15) by:

$$A0 = f^*(1 \pm m) \quad (46)$$

where m is the transverse multiplication factor and f is the focal point of the compound lens. When the photo detecting unit is located at a position at a distance $\Delta$ toward the compound lens, the distance A between the rear principal point of the compound lens and the photo detecting unit 70 is given by:

$$A = A0 - \Delta \quad (47)$$
$$= f^*(1 \pm m) - \Delta$$

When equation (47) is substituted in equation (21), we have:

$$h2 = h^* - A\beta2$$
$$= \beta0\{\mp\Delta/m - (\mp m \mp \Delta/f^*) \cdot 2\delta\}$$

Substitution of equation (20) in this equation provides:

$$h2 = \{\mp\Delta/m - (\mp m + \Delta/f^*) \cdot 2\delta\} \cdot \{y/[f0+(-1-a/f0)(2\delta+b)]\} \quad (48)$$

This equation (48) can be applied to a relatively wide range of optical systems for defocusing detection, and can be used as a general formula. When it is assumed that $\Delta=0$ in equation (48), equation (21) is obtained. When it is assumed that $\Delta=0$ and $b=0$ in equation (48), equation (10) is obtained.

The state close to the just in-focusing state will now be considered. When the radius of the aperture of the objective lens 50, that is, the exit pupil is represented by r, a is set to 0, and the distance F between the main principal point of the objective lens 50 closer to the optical disk 12, the convergent point (beam waist) is set to satisfy $F=f0+b$ and $F+2\delta \approx F(\delta << F)$, equation (48) above can be rewritten as:

$$h2 = \{\pm\Delta/m + (\mp m + \Delta/f^*)\times 2\delta\} \cdot r/F \quad (49)$$

Equation (49) above indicates the distance between the center of the beam spot on the photo detecting unit 70 along the optical axis and the outermost periphery thereof. Accordingly, if the total area of light receiving regions of the photo detecting unit 70 is not larger than that of the circle having the radius given by:

$$|h2| = r/F\{\pm\Delta/m + (\mp m + \Delta/f^*)\times 2\delta c\}$$

the beam spot on the photo detecting unit 70 extends outside the regions for a given defocusing allowance $\delta c$ and a detection output is attenuated. When it is assumed that $|\delta c| \approx 2.0$ μm, since generally $m >> \Delta/f^*$,
 if $\Delta > 0$, from $\delta = +|\delta c|$
 $|h2|$ is greater if $\delta = -|\delta c|$
 If, however, $\Delta < 0$, from $\delta = -|\delta c|$
 $|h2|$ is greater if $\delta = +|\delta c|$
A condition to attain a maximum value of $|h2|$ when $|\delta c| \approx 2.0$ μm is caused is given to be:

$$Rd = |h2| = r/F\{|\Delta|/m + (m+|\Delta|/f^*)\times 2|\delta c|\}$$

Accordingly, even if the defocusing of $|\delta c| = 2.0$ μm is caused, if the photo detecting unit has photo sensitive regions having a radius of not less than Rd, the beam spot may not extend outside the unit 70 and a detection output may not be attenuated.

The allowable shift amount $\Delta$ of the photo detecting unit 70 will now be calculated. Here a condition $a=0$ is considered. In other words, the path of the light rays at a distance y from the optical axis and at a distance a from the objective lens 50, and the state close to the just in-focusing state ($\delta=0$) is only considered. Therefore, assuming $F=f0+b$, equation (45) can be rewritten as:

$$h2 = \{\pm\Delta/m + (\mp m + \Delta/f^*) \cdot 2\delta\}\{y/(f0 + b)\} \quad (50)$$
$$= \{\pm\Delta/m + (\mp m + \Delta/f^*) \cdot 2\delta\}(y/F)$$

That is, with the defocusing amount $\delta$, the light rays are shifted on the unit 70 by a distance:

$$\{(\mp m+\Delta/f^*)\times 2y\delta\}/F$$

and the defocusing is detected. However, when the photo detecting unit is arranged at a position deviated from the image forming plane for the light reflecting layer 24 of the optical disk 12, the laser spot is shifted on the unit due to a vertical displacement of the optical disk 12 or the like. Then, even if the optical system is in the just in-focusing state, the defocusing state is erroneously detected. The displacement of the beam spot is thus calculated. The inclination angle of the light reflecting layer 24 of the optical disk 12 with respect to its horizontal state is represented by $\theta$. When the main light rays passing along the optical axis of the objective lens 50 are reflected by the optical disk 12 and reach the front principal plane of the objective lens 50, the shift or deviation $\eta$ of the beam spot in the just in-focusing state is given by:

$$\eta = 2\theta F$$

where F is the distance between the front principal point of the objective lens 50 and the image forming plane on the optical disk 12. When the radius of the exit pupil or aperture of the objective lens 50 is represented by r, a ratio $\rho$ of the beam shift on the objective lens 50 is given by:

$$\rho = \eta/r = 2\theta F/r$$

From the geometric/optical characteristics, the deviation $\xi$ of the main light rays on the photo detecting unit 70 is given from equation (50) as:

$$\xi = \pm\Delta r/mF \times \rho = \pm 2\theta\Delta/m \quad (51)$$

The allowance of the defocusing amount δc when the optical disk 12 is inclined will now be considered. The shift amount Hc of the outermost periphery of the beam spot unit 70 is given by:

$$Hc = 2r\delta c \times (\mp m + \Delta/f^*)/F \quad (52)$$

A comparison of equations (51) and (52) reveals that the deviation ξ of the spot on the photo detecting unit 70 which is given by equation (51) indicates a value when the aperture of the objective lens 50 is infinitely large. However, in practice, light reflected by the light reflecting layer 24 of the optical disk 12 is limited by a finite size of the aperture or the pupil of the objective lens 50. The light rays are further limited by the knife edge, prism, mirror and the like. For this reason, the spot itself on the photo detecting unit 70 is not moved very much but the intensity distribution within the spot changes. Equation (52) provides a change in the outermost position of the spot on the photo detecting unit 70 in the defocusing state. However, when the overall shift of the spot on the photo detecting unit 70 in the defocusing state is considered, the positions of ends of the knife edge, prism, mirror and the like must also be considered. Thus, the overall shift of the spot cannot be obtained with only equations (51) and (52). However, an approximate estimation can be provided.

For the inclination angle θ of the optical disk 12 with respect to its horizontal state, the optical system operates stably without a significant defocusing within the shift range of:

$$|\xi(\theta, \Delta)| < |Hc|$$

When it is assumed that $m << \Delta/f^*$ in equation (52) and when calculations are performed neglecting the inclination, defocusing or the deviation direction of the unit 70 from the image forming plane and assuming that $\theta > 0$, $\delta c > 0$ and $\Delta > 0$, we have, from equations (51) and (52):

$$2\theta\Delta/m \leq 2r\delta c \times (\mp m + \Delta/f^*)/F \quad (53)$$

A maximum allowable value θmax of the angle θ in the system in accordance with the DAD standards is given to be:

$$\theta max = 1° = \pi/180 (radian)$$

When this value is substituted in equation (52), $$(\theta max/m \pm r\delta c/f^*F)\Delta \leq rm\delta c/F$$

and the allowable shift amount Δ of the photo detecting unit 70 is calculated to be:

$$\Delta \leq rm\delta c \times (F\theta max/m - y\delta c/f^*)^{-1}$$

When it is assumed that $m << \Delta/f^*$ and the term $\Delta/f^*$ is eliminated, equation (53) can be rewritten as:

$$2\Delta\theta max/m \leq 2r\delta c \times m/F$$

and $$\Delta \leq rm^2\delta c/F\theta max$$

As may be apparent from the above description, the total area of the photo sensitive regions 78-1A, 78-1B, 78-2A and 78-2B of the photo detecting unit 70 is larger than that of a circle having the radius $R0 = 2myM/(F \pm \delta c)$ if the photo sensitive regions are located on the image forming plane. However, when the photo sensitive regions are shifted from the image forming plane along the optical axis by the amount Δ, the total area becomes larger than that of a circle having the radius $$Rd = (r/F)\{|\Delta|/m + (m + |\Delta|/f^*) \times 2|\delta c|\}.$$

Thus, since the second photo detecting unit 70 is located at a position slightly shifted from the image forming plane or convergent point, the image pattern of the information recording pits in the light reflecting layer 24 of the optical disk 12 appears clearly on the photo detecting unit 70 and does not generate any disturbance noise signal. Even if the disk 12 is deformed and the substrate is inclined, the defocusing due to aberration of the objective lens 50 is less frequently caused. The defocusing detection sensitivity is not degraded in the state close to the just in-focusing state, and a detection sensitivity substantially close to the value calculated in accordance with geometric/optical characteristics is obtained. A lens having a relatively large aberration can be used as a detection system lens, and optical characteristics are not degraded even if such a lens is used. When the image pattern of the information of the light reflecting layer 24 is blurred on the photo detecting unit 70 in the just in-focusing state, the influence of the aberration of the lens or pits is reduced, and the positioning error margin of the unit 70 or the defocusing detection sensitivity is improved. When the photo detecting unit 70 is not moved until it receives the light diffraction pattern of the projections or grooves on the light reflecting layer 24, defocusing detection can be performed with stability and reliability.

When the light-receiving area of the photo detecting unit 70 has an area greater than that of a circle having the radius $(r/F)\{|\Delta|/m + (m + |\Delta|/f^* \cdot 2|\delta c|\}$, even if the defocusing is caused, the beam spot does not extend outside the unit 70 and the defocusing detection signal is not attenuated. Accordingly, even if a slight defocusing occurs, a defocusing detection signal of satisfactory level is obtained, so that the position correction of the objective lens 50 against such defocusing can be readily performed.

When the distance Δ between the image forming plane in the just in-focusing state and the photo detecting unit 70 falls within the range of:

$$|\Delta| < rm\delta c/(F\theta max/m - y\delta c/f^*)$$

for $\theta max = \pi/180$ and $\delta c = 1 \mu m$, reliable and stable focusing operation can be performed even if there is a slight inclination in the optical disk 12 or the like. Even if the optical disk 12 is inclined up to $\theta max = 1°$, a defocusing is not caused up to $\delta c = 1.0 \mu m$, so that the optical head can operate stably.

What is claimed is:

1. Optical apparatus for focusing a light beam onto a light-reflecting surface, comprising:
   means for generating a light beam;
   objective lens means for (a) converging said light beam into a converged beam having a beam waist, (b) projecting said converged beam onto said light-reflecting surface, and (c) reconverging light reflected from said light-reflecting surface, said objective lens means having a convergent point and an inherent maximum defocusing allowance of $\pm\delta c$ with reference to said convergent point;

deflecting means for deflecting the reconverged light in accordance with a distance between said objective lens means and said light-reflecting surface;

converging lens means for converging the reconverged light into a convergent beam; and photodetector means, having photo sensitive regions, for receiving said convergent beam and forming therefrom a beam spot on a surface of at least one of said photo sensitive regions, said photo sensitive regions having a total surface area which is greater than an area of said beam spot when said objective lens means projects said converged beam at said maximum defocusing allowance $\pm\delta c$.

2. Apparatus according to claim 1, wherein said photo sensitive regions are located at a convergent point of said converging lens means.

3. Apparatus according to claim 1, wherein said photo sensitive regions have the total surface area greater than an area of a circle having a radius RO given by:

$$RO = 2my\delta c/(F+2\delta c)$$

where F is a distance between a principal point of the objective lens means and a convergent point of the objective lens means, y is a radius of an aperture of said objective lens means, and m is a multiplication factor of the beam spot formed on the photo sensitive regions where $m = D2/D1$ where D1 is a diameter of the converged beam intersecting said light-reflecting surface, and D2 is a diameter of said beam spot.

4. Apparatus according to claim 1, wherein said photosensitive regions are located at a point which is deviated by a distance $\Delta$ from a convergent point of said converging lens means.

5. Apparatus according to claim 4, wherein said photo sensitive regions have the total surface area which is greater than an area of a circle having a radius Rd given by:

$$Rd = (r/F)\{|\Delta|/m + (m+|\Delta|/f^*)2|\delta c|\}$$

where F is a distance between a principal point of said objective lens means and a convergent point of said objective lens means, r is a radius of an exit pupil of said objective lens means, m is a multiplication factor of the beam spot formed on the photo sensitive regions where $m = D2/D1$ where D1 is a diameter of the converged beam intersecting said light-reflecting surface, and D2 is a diameter of said beam spot, and $f^*$ is a focal length of said converging lens means.

6. Apparatus according to claim 1, wherein said maximum defocusing allowance $\delta c$ is approximately 2.0 $\mu$m.

7. Apparatus according to claim 5, wherein said maximum defocusing allowance $\delta c$ is approximately 1.0 $\mu$m.

8. Apparatus according to claim 7, wherein said distance $\Delta$ is given by:

$$|\Delta| \leq ym\delta c/(F\theta max/m - y\delta c/f^*)$$

where y is a distance between an optical axis lying between said objective lens means and said converging lens means and a point of a principal plane of the objective lens means at which the reconverged light passes, and $\theta max$ is an angle of inclination of said light-reflecting surface with respect to said converged beam.

9. Apparatus according to claim 8, wherein said distance $\Delta$ is given by:

$$|\Delta| \leq rm^2\delta c/F\theta max$$

where $\theta max$ is an angle of inclination of said light-reflecting surface with respect to said converged beam.

10. Apparatus according to claim 1, wherein said deflecting means includes a light-shielding plate which transmits only part of the reconverged light passing through a region spaced apart from an optical axis of said converging lens means.

11. Apparatus according to claim 1, wherein said deflecting means comprises a convex lens having an optical axis which intersects with an optical axis of said objective lens means.

12. Apparatus according to claim 1, wherein said deflecting means comprises a prism arranged between said converging lens means and the light-reflecting surface.

13. Apparatus according to claim 1, wherein said deflecting means comprises a mirror arranged between said converging lens means and the light-reflecting surface.

* * * * *